(12) United States Patent
Matsuyama

(10) Patent No.: US 10,208,202 B2
(45) Date of Patent: Feb. 19, 2019

(54) THERMOPLASTIC RESIN COMPOSITION CONTAINING POLYCARBONATE RESIN, GRAFT COPOLYMER, AND COPOLYMER, AND MOLDED ARTICLE THEREOF

(71) Applicant: UMG ABS, LTD., Tokyo (JP)

(72) Inventor: Hironori Matsuyama, Ube (JP)

(73) Assignee: UMG ABS, LTD., Tokyo (JP)

( * ) Notice: Subject to any disclaimer, the term of this patent is extended or adjusted under 35 U.S.C. 154(b) by 17 days.

(21) Appl. No.: 15/311,049

(22) PCT Filed: May 19, 2015

(86) PCT No.: PCT/JP2015/064272
§ 371 (c)(1),
(2) Date: Nov. 14, 2016

(87) PCT Pub. No.: WO2015/190237
PCT Pub. Date: Dec. 17, 2015

(65) Prior Publication Data
US 2017/0107373 A1    Apr. 20, 2017

(30) Foreign Application Priority Data
Jun. 13, 2014 (JP) ................. 2014-122591

(51) Int. Cl.
C08L 69/00 (2006.01)
C08L 51/04 (2006.01)
C08L 51/00 (2006.01)
C08F 212/10 (2006.01)
C08F 265/04 (2006.01)

(52) U.S. Cl.
CPC ........... *C08L 69/00* (2013.01); *C08F 212/10* (2013.01); *C08F 265/04* (2013.01); *C08L 51/003* (2013.01); *C08L 51/04* (2013.01); C08L 2205/03 (2013.01)

(58) Field of Classification Search
CPC ................................... C08L 69/00
See application file for complete search history.

(56) References Cited

U.S. PATENT DOCUMENTS

| | | | |
|---|---|---|---|
| 7,488,775 B2 | 2/2009 | Nakai et al. | |
| 8,129,469 B2 | 3/2012 | O et al. | |
| 9,505,866 B2 | 11/2016 | Maeda et al. | |
| 9,556,302 B2 | 1/2017 | Miyahiro et al. | |
| 2005/0239949 A1* | 10/2005 | Nakamura | C08F 265/04 524/502 |
| 2008/0015290 A1* | 1/2008 | Siripurapu | C08F 265/04 524/115 |
| 2013/0345362 A1* | 12/2013 | Maeda | C08F 265/04 525/71 |
| 2017/0015823 A1 | 1/2017 | Tanigawa et al. | |

FOREIGN PATENT DOCUMENTS

| | | |
|---|---|---|
| CN | 1486347 A | 3/2004 |
| CN | 102399424 A | 4/2012 |
| CN | 103443154 A | 12/2013 |
| CN | 103649141 A | 3/2014 |
| EP | 3121226 A1 | 1/2017 |
| JP | 11001522 * | 1/1999 |
| JP | 2004-143287 A | 5/2004 |
| JP | 2006-257127 A | 9/2006 |
| JP | 2007-308648 A | 11/2007 |
| JP | 2009-203270 A | 9/2009 |
| JP | 2010-077379 A | 4/2010 |
| JP | 2014-181279 A | 3/2013 |
| JP | 2013-151652 A | 8/2013 |
| WO | WO 2012/133190 * | 10/2012 |

OTHER PUBLICATIONS

Horiba Scientific "Guidebook to Particle Size Analysis." (2012) pp. 1-30. (Year: 2012).*
Reddy, Dilute Solution Properties of Styrene-Acrylonitrile and Styrene-Methyl Methacrylate Copolymers I. Journal of Polymer Science Polymer Physics Edition vol. 14 pp. 749-757 (1976). (Year: 1976).*
Europe Patent Office, "Search Report for European Patent Application No. 15806765.2," dated Dec. 20, 2017.
PCT/ISA/210, "International Search Report for International Application No. PCT/JP2015/064272," dated Jul. 28, 2015.

* cited by examiner

*Primary Examiner* — David J Buttner
(74) *Attorney, Agent, or Firm* — Manabu Kanesaka

(57) ABSTRACT

A thermoplastic resin composition includes 10 to 95 parts by weight of a polycarbonate resin (A); 5 to 90 parts by weight of a graft copolymer (B); and 0 to 50 parts by weight of a copolymer (C). The graft copolymer (B) is produced by the graft polymerization of 10 to 80 parts by weight of a rubbery polymer with 20 to 90 parts by weight of a monomer component including an aromatic vinyl monomer and/or a cyanide vinyl monomer, wherein the rubbery polymer has a weight average particle size of 150 to 450 nm and also has a 10 wt % particle size of 50 to 250 nm and a 90 wt % particle size of 450 to 650 nm in a particle size cumulative weight fraction. The copolymer (C) is produced by copolymerizing an aromatic vinyl monomer, a cyanide vinyl monomer and another vinyl monomer with one another.

20 Claims, No Drawings

US 10,208,202 B2

THERMOPLASTIC RESIN COMPOSITION CONTAINING POLYCARBONATE RESIN, GRAFT COPOLYMER, AND COPOLYMER, AND MOLDED ARTICLE THEREOF

TECHNICAL FIELD

The present invention relates to a thermoplastic resin composition which includes a polycarbonate resin and a graft copolymer including, as a rubber component, a rubbery polymer having a specific average particle size and particle size distribution, and which has an excellent balance of properties such as impact resistance, fluidity and heat resistance. The invention also relates to a molded article obtained by molding the thermoplastic resin composition.

BACKGROUND ART

Compositions including a polycarbonate resin and an ABS resin (hereinafter, written as "PC/ABS resin composition") are used in various applications including vehicle parts, home appliances and office equipment parts because of their excellent impact resistance, heat resistance and workability during molding. Because ABS resin is poor in weather resistance due to their containing a butadiene rubber, compositions have been presented which include a polycarbonate resin and a resin free from this diene in the polymer main chain, for example, an AES resin including an ethylene-propylene-non-conjugated diene rubber, or an ASA resin including an acrylic rubber (hereinafter, written as "PC/ASA resin compositions").

Patent Literature (PTL) 1 presents a thermoplastic resin composition which includes an ASA resin that includes a specific composite rubber composed of a conjugated diene rubbery polymer and a crosslinked acrylate ester polymer, and a polycarbonate resin.

Patent Literature 2 presents an aromatic polycarbonate resin composition that includes an aromatic polycarbonate resin, a copolymer as a fluidity modifier which includes polymer units derived from a specific (meth)acrylate ester such as phenyl methacrylate and polymer units derived from an aromatic vinyl, and a rubber-modified resin as an impact modifier.

PTL 1: Japanese Patent Publication 2013-151652A
PTL 2: Japanese Patent Publication 2006-257127A Conventional thermoplastic resin compositions are still insufficient and are to be improved in terms of the balance of properties such as impact resistance, fluidity and heat resistance.

An object of the invention is to provide a thermoplastic resin composition having an excellent balance of properties such as impact resistance, fluidity and heat resistance, and to provide a molded article obtained from the thermoplastic resin composition.

SUMMARY OF INVENTION

The present inventor has found that the above object can be achieved by using a graft copolymer obtained by graft polymerizing a monomer such as a vinyl cyanide monomer or an aromatic vinyl monomer to a rubbery polymer having a specific average particle size and particle size distribution. The present invention has been completed based on the finding.

Specifically, a summary of the invention is as described below.

[1] A thermoplastic resin composition comprising 10 to 95 parts by weight of a polycarbonate resin (A) and 5 to 90 parts by weight of a graft copolymer (B) wherein the total is 100 parts by weight,
the graft copolymer (B) being a graft copolymer obtained by graft polymerizing 20 to 90 parts by weight of at least one monomer including at least an aromatic vinyl monomer and/or a vinyl cyanide monomer to 10 to 80 parts by weight of a rubbery polymer having a weight average particle size of 150 to 450 nm and having a particle size for a cumulative weight fraction of 10 wt % of 50 to 250 nm and a particle size for a cumulative weight fraction of 90 wt % of 450 to 650 nm (wherein the total of the rubbery polymer and the monomer(s) is 100 parts by weight).

[2] A thermoplastic resin composition comprising 10 to 95 parts by weight of a polycarbonate resin (A), 5 to 90 parts by weight of a graft copolymer (B), and not more than 50 parts by weight of a copolymer (C) wherein the total is 100 parts by weight,
the graft copolymer (B) being a graft copolymer obtained by graft polymerizing 20 to 90 parts by weight of at least one monomer including at least an aromatic vinyl monomer and/or a vinyl cyanide monomer to 10 to 80 parts by weight of a rubbery polymer having a weight average particle size of 150 to 450 nm and having a particle size for a cumulative weight fraction of 10 wt % of 50 to 250 nm and a particle size for a cumulative weight fraction of 90 wt % of 450 to 650 nm (wherein the total of the rubbery polymer and the monomer(s) is 100 parts by weight); and
the copolymer (C) being a copolymer obtained by copolymerizing at least two monomers selected from the group consisting of an aromatic vinyl monomer, a vinyl cyanide monomer and another vinyl monomer copolymerizable with these monomers.

[3] A molded article obtained by molding the thermoplastic resin composition according to [1] or [2].

Advantageous Effects of Invention

The thermoplastic resin composition according to the present invention has an excellent balance of properties such as impact resistance, fluidity and heat resistance, and such molded articles obtained from the thermoplastic resins are also provided.

DESCRIPTION OF EMBODIMENTS

Hereinbelow, embodiments of the invention will be described in detail.

In the invention, the term "(meth)acrylic acid" means one or both of "acrylic acid" and "methacrylic acid". The term "alkyl (meth)acrylate ester" indicates one or both of "alkyl acrylate ester" and "alkyl methacrylate ester". The same applies to the term "(meth)acrylate".

The polycarbonate resin (A) is sometimes written as the "component (A)", the graft copolymer (B) as the "component (B)", and the copolymer (C) as the "component (C)".

[Thermoplastic Resin Composition]

A thermoplastic resin composition of the present invention includes 10 to 95 parts by weight of a polycarbonate resin (A), 5 to 90 parts by weight of a graft copolymer (B) described below, and 0 to 50 parts by weight of a copolymer (C) described below in a total amount of 100 parts by weight.

The graft copolymer (B) is a graft copolymer obtained by graft polymerizing 20 to 90 parts by weight of one, or two or more monomers including at least an aromatic vinyl monomer and/or a vinyl cyanide monomer onto 10 to 80 parts by weight of a rubbery polymer. The rubbery polymer has a weight average particle size of 150 to 450 nm. The rubbery polymer has a particle size for a cumulative weight fraction of 10 wt % of 50 to 250 nm and a particle size for a cumulative weight fraction of 90 wt % of 450 to 650 nm (wherein the total of the rubbery polymer and the monomer(s) is 100 parts by weight).

The copolymer (C) is a copolymer obtained by copolymerizing two or more monomers selected from an aromatic vinyl monomer, a vinyl cyanide monomer and another vinyl monomer copolymerizable with these monomers.

The thermoplastic resin composition of the present invention attains an excellent balance of properties such as impact resistance, fluidity and heat resistance by its containing 10 to 95 parts by weight of the polycarbonate resin (A), 5 to 90 parts by weight of the graft copolymer (B), and 0 to 50 parts by weight of the copolymer (C). Even a failure to satisfy these conditions by any one of these components results in a poor balance of properties such as impact resistance, fluidity and heat resistance. From the point of view of the balance of properties, the content of the polycarbonate resin (A) is preferably 20 to 90 parts by weight, and more preferably 30 to 70 parts by weight. The content of the graft copolymer (B) is preferably 10 to 80 parts by weight, and more preferably 10 to 60 parts by weight. The content of the copolymer (C) is preferably 0 to 45 parts by weight, and more preferably 0 to 40 parts by weight. (The total of the polycarbonate resin (A), the graft copolymer (B) and the copolymer (C) is 100 parts by weight.)

<Polycarbonate Resin (A)>

The polycarbonate resin (A) is a polymer obtained by a phosgene process in which various dihydroxydiaryl compounds are reacted with phosgene, or by a transesterification process in which a dihydroxydiaryl compound is reacted with a carbonate ester such as diphenyl carbonate. Typical examples include aromatic polycarbonate resins produced from 2,2-bis(4-hydroxyphenyl)propane (bisphenol A).

Examples of the dihydroxydiaryl compounds other than bisphenol A include bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(4-hydroxy-3-bromophenyl)propane, 2,2-bis(4-hydroxy-3,5-dibromophenyl)propane and 2,2-bis(4-hydroxy-3,5-dichlorophenyl)propane, bis(hydroxyaryl)cycloalkanes such as 1,1-bis(4-hydroxyphenyl)cyclopentane and 1,1-bis(4-hydroxyphenyl)cyclohexane, dihydroxydiaryl ethers such as 4,4'-dihydroxydiphenyl ether and 4,4'-dihydroxy-3,3'-dimethyldiphenyl ether, dihydroxydiaryl sulfides such as 4,4'-dihydroxydiphenyl sulfide and 4,4'-dihydroxy-3,3'-dimethyldiphenyl sulfide, dihydroxydiaryl sulfoxides such as 4,4'-dihydroxydiphenyl sulfoxide, and dihydroxydiaryl sulfones such as 4,4'-dihydroxydiphenyl sulfone and 4,4'-dihydroxy-3,3'-dimethyldiphenyl sulfone.

These compounds may be used solely, or two or more may be used in combination. Further, these compounds may be used as mixtures with other compounds such as piperazine, dipiperidyl hydroquinone, resorcin and 4,4'-dihydroxydiphenyl.

The above dihydroxydiaryl compounds may be used as mixtures with trihydric or polyhydric phenol compounds described below. Examples of such trihydric or polyhydric phenols include phloroglucine, 4,6-dimethyl-2,4,6-tri-(4-hydroxyphenyl)-heptene, 2,4,6-trimethyl-2,4,6-tri-(4-hydroxyphenyl)-heptane, 1,3,5-tri-(4-hydroxyphenyl)-benzol, 1,1,1-tri-(4-hydroxyphenyl)-ethane and 2,2-bis-(4,4-di(4-hydroxyphenyl)cyclohexyl)-propane.

The viscosity average molecular weight (Mv) of the polycarbonate resin (A) is preferably 10,000 to 80,000, or in particular 15,000 to 60,000.

The polycarbonate resin (A) is preferably produced by reacting the materials such as the dihydroxydiaryl compound optionally with use of reagents such as a molecular weight modifier and a catalyst so as to obtain a viscosity average molecular weight in the above range.

Specific examples of the polycarbonate resins (A) include "Iupilon series" and "NOVAREX series" manufactured by Mitsubishi Engineering-Plastics Corporation, and "TARFLON series" manufactured by Idemitsu Kosan Co., Ltd.

In the invention, two or more kinds of the polycarbonate resins (A) may be used as a mixture. For example, two or more kinds of polycarbonate resins having different viscosity average molecular weights may be mixed together to control the viscosity average molecular weight to fall in the above preferred range.

<Graft Copolymer (B)>

The graft copolymer (B) is one obtained by graft polymerizing an aromatic vinyl monomer and/or a vinyl cyanide monomer and optionally at least one monomer selected from additional vinyl monomers copolymerizable with the above monomers, in the presence of a rubbery polymer having a specific average particle size and particle size distribution (hereinafter, sometimes written as the "rubbery polymer (e)").

The type of rubber of the rubbery polymer (e) used in the invention is not particularly limited. Examples include diene rubbers such as polybutadiene, alkyl (meth)acrylate rubbers such as butyl acrylate rubber, ethylene-propylene copolymer rubbers such as ethylene-propylene rubber, polyorganosiloxane rubbers, diene/alkyl (meth)acrylate composite rubbers, and polyorganosiloxane/alkyl (meth)acrylate composite rubbers. Preferred rubbers are alkyl (meth)acrylate rubbers, diene/alkyl (meth)acrylate composite rubbers and polyorganosiloxane/alkyl (meth)acrylate composite rubbers.

These rubbery polymers may be used solely, or two or more may be used in combination.

From the point of view of impact resistance, the weight average particle size of the rubbery polymer (e) is 150 to 450 nm, and preferably 200 to 400 nm. The weight average particle size of the rubbery polymer (e) may be controlled by a known method.

From the point of view of impact resistance, the particle size of the rubbery polymer (e) for a cumulative weight fraction of 10 wt % is 50 to 250 nm and that for a cumulative weight fraction of 90 wt % is 450 to 650 nm, and preferably the particle size for a 10 wt % fraction is 100 to 200 nm and that for a 90 wt % fraction is 500 to 600 nm.

The particle sizes of the rubbery polymer (e) for the respective cumulative weight fractions may be controlled by a known method for controlling a particle size distribution. Some example methods are described below.

In continuous polymerization, an emulsifier and a rubbery monomer as a raw material for a rubbery polymer are introduced over a long time so as to produce a rubbery polymer having the desired particle size distribution.

Rubbery polymers having different particle sizes are provided separately and are mixed together so as to give a rubbery polymer having the desired particle size distribution.

A rubbery polymer having a relatively small particle size is produced first and is thereafter enlarged by aggregation so as to form an aggregated and enlarged rubbery polymer having the desired particle size distribution.

When the rubbery polymer is produced by emulsion polymerization, the weight average particle size and the particle size distribution may be controlled by appropriately selecting the type and amount of the emulsifier. In continuous polymerization, dropping of a rubbery monomer is accompanied by a decrease in the pH of the latex, and the stability of the latex is sometimes lost to cause the generation of coagula. In such a case, the polymerization may be conducted stably by using an emulsifier that exhibits a stable emulsifying ability even under acidic conditions such as sodium alkylbenzenesulfonate.

When a rubbery polymer is produced with a relatively small particle size and is thereafter enlarged, the enlargement treatment is preferably performed by mixing the latex of the relatively small particulate rubbery polymer with a latex of an acid group-containing copolymer, and is more preferably such that a condensed acid salt is added prior to the mixing of the acid group-containing copolymer latex. Such enlargement provides a rubbery polymer (e) having the desired average particle size and particle size distribution. The addition of a condensed acid salt controls the formation of a rubbery polymer having a small particle size.

The condensed acid salt added prior to the mixing of the acid group-containing copolymer latex in the enlargement treatment may be a salt of a condensed acid such as of phosphoric acid or silicic acid, with an alkali metal and/or an alkaline earth metal. A preferred condensed acid salt is a salt of pyrophosphoric acid, which is the condensed acid of phosphoric acid, with an alkali metal. Sodium pyrophosphate or potassium pyrophosphate is particularly preferable. The amount in which the condensed acid salt is added is preferably 0.1 to 10 parts by weight, and more preferably 0.5 to 7 parts by weight with respect to 100 parts by mass (in terms of solids) of the relatively small particulate rubbery polymer latex. If the amount of the condensed acid salt added is below the lower limit, the enlargement does not proceed sufficiently. If the amount of the condensed acid salt is above the upper limit, the enlargement does not proceed sufficiently or the stability of the rubber latex is sometimes lost to cause a heavy generation of coagula.

The acid group-containing copolymer latex used in the enlargement is one obtained by polymerizing in water a monomer mixture including an acid group-containing monomer, an alkyl (meth)acrylate ester monomer and optionally an additional monomer copolymerizable with the above monomers.

The acid group-containing monomer is preferably a carboxyl group-containing unsaturated compound. Examples of such compounds include (meth)acrylic acid, itaconic acid and crotonic acid, with (meth)acrylic acid being particularly preferable. The acid group-containing monomers may be used solely, or two or more may be used in combination.

Examples of the alkyl (meth)acrylate ester monomers include esters of acrylic acid and/or methacrylic acid with an alcohol having a $C_{1-12}$ linear or branched alkyl group, such as methyl acrylate, ethyl acrylate, propyl acrylate, n-butyl acrylate, isobutyl acrylate, t-butyl acrylate, 2-ethylhexyl acrylate, methyl methacrylate, ethyl methacrylate, propyl methacrylate, n-butyl methacrylate, isobutyl methacrylate, t-butyl methacrylate and 2-ethylhexyl methacrylate. Of these, those alkyl (meth)acrylate esters having a $C_{1-8}$ alkyl group are particularly preferable. The alkyl (meth)acrylate ester monomers may be used solely, or two or more may be used in combination.

The additional monomers are those monomers which are copolymerizable with the acid group-containing monomers and the alkyl (meth)acrylate ester monomers and do not belong to acid group-containing monomers or alkyl (meth) acrylate ester monomers. Examples of the additional monomers include aromatic vinyl monomers (for example, styrene, α-methylstyrene and p-methylstyrene), vinyl cyanide monomers (for example, acrylonitrile and methacrylonitrile), and compounds having two or more polymerizable functional groups (for example, allyl methacrylate, polyethylene glycol dimethacrylate ester, triallyl cyanurate, triallyl isocyanurate and triallyl trimellitate). The additional monomers may be used solely, or two or more may be used in combination.

The amounts of the polymerizable monomers expressed in terms of the proportions relative to 100 wt % of the acid group-containing copolymer latex are such that the amount of the acid group-containing monomer is preferably 5 to 40 wt %, or more preferably 8 to 30 wt %, the amount of the alkyl (meth)acrylate ester monomer is preferably 60 to 95 wt %, or more preferably 70 to 92 wt %, and the amount of the additional copolymerizable monomer is preferably 0 to 48 wt %, or more preferably 0 to 30 wt %. If the proportion of the acid group-containing monomer is below the lower limit, an insufficient enlargement ability results. If the proportion of the acid group-containing monomer is above the upper limit, large amounts of coagula are formed during the production of the acid group-containing copolymer latex.

The acid group-containing copolymer latex may be produced by a usual emulsion polymerization method.

The emulsifier used in the emulsion polymerization may be a single or a combination of two or more kinds of known emulsifiers such as anionic emulsifiers selected from, among others, carboxylate emulsifiers represented by alkali metal salts of oleic acid, palmitic acid, stearic acid and rosin acid, and alkali metal salts of alkenylsuccinic acids, as well as alkylsulfate esters, sodium alkylbenzenesulfonates, sodium alkylsulfosuccinates and sodium polyoxyethylene nonylphenyl ether sulfate esters.

The emulsifier may be used in such a manner that the whole amount is added at once during an initial stage of polymerization, or a portion is used at an initial stage and the rest is added during the polymerization intermittently or continuously. The amount and manner in which the emulsifier is used have impacts on the particle size of the acid group-containing copolymer latex and thus on the particle size of the enlarged rubbery polymer (e). It is therefore necessary to use the emulsifier in an appropriate amount and in an appropriate manner.

The polymerization may involve a polymerization initiator such as a thermally decomposable initiator or a redox initiator. Examples of the thermally decomposable initiators include potassium persulfate, sodium persulfate and ammonium persulfate. Examples of the redox initiators include combinations of an organic peroxide such as cumene hydroperoxide, sodium formaldehyde sulfoxylate, and an iron salt. These initiators may be used solely, or two or more may be used in combination.

To control the molecular weight, mercaptans such as t-dodecylmercaptan and n-octylmercaptan, and chain transfer agents such as terpinolene and α-methylstyrene dimer may be used. To adjust the pH, alkalis, acids and electrolytes as viscosity depressants may be added.

The amount in which the acid group-containing copolymer latex is added is preferably 0.1 to 10 parts by mass (in terms of solids), and more preferably 0.3 to 7 parts by mass with respect to 100 parts by mass (in terms of solids) of the relatively small particulate rubbery polymer latex. If the amount of the acid group-containing copolymer latex is below the lower limit, the enlargement does not proceed sufficiently and large amounts of coagula are sometimes generated. If the amount of the acid group-containing copolymer latex is above the upper limit, the pH of the enlarged latex is so decreased that the stability of the latex tends to be lost.

A crosslinked structure may be introduced into the rubbery polymer (e). Examples of the crosslinking agents used in this case include divinylbenzene, allyl (meth)acrylate, ethylene glycol di(meth)acrylate, diallyl phthalate, dicyclopentadiene di(meth)acrylate, trimethylolpropane tri(meth)acrylate, pentaerythritol tetra(meth)acrylate, 1,4-butanediol di(meth)acrylate, 1,6-hexanediol di(meth)acrylate, triallyl cyanurate and triallyl isocyanurate. These agents may be used solely, or two or more may be used in combination.

Of the monomers graft polymerized on the rubbery polymer (e), examples of the aromatic vinyl monomers include styrene, α-methylstyrene, p-methylstyrene and bromostyrene. One, or two or more of these monomers may be used. Styrene and α-methylstyrene are particularly preferable.

Examples of the vinyl cyanide monomers include acrylonitrile, methacrylonitrile, ethacrylonitrile and fumaronitrile. One, or two or more of these monomers may be used. Acrylonitrile is particularly preferable.

In addition to the aromatic vinyl monomer and the vinyl cyanide monomer, an additional vinyl monomer copolymerizable with these monomers may be graft polymerized on the rubbery polymer (e). Examples of the copolymerizable additional vinyl monomer include (meth)acrylate ester monomer, maleimide monomer and amide monomer. One, or two or more of these monomers may be used.

Examples of the (meth)acrylate ester monomers include methyl (meth)acrylate, ethyl (meth)acrylate, propyl (meth)acrylate, butyl (meth)acrylate, 2-ethylhexyl (meth)acrylate, phenyl (meth)acrylate, 4-t-butylphenyl (meth)acrylate, bromophenyl (meth)acrylate, dibromophenyl (meth)acrylate and chlorophenyl (meth)acrylate.

Examples of the maleimide monomers include N-phenylmaleimide and N-cyclohexylmaleimide.

Examples of the amide monomers include acrylamide and methacrylamide.

The above monomers may be graft polymerized to the rubbery polymer (e) in any proportion without limitation. Some preferred ratios are described below:

60 to 90 wt % aromatic vinyl monomer, 10 to 40 wt % vinyl cyanide monomer, and 0 to 30 wt % copolymerizable additional vinyl monomer;

30 to 80 wt % aromatic vinyl monomer, 20 to 70 wt % (meth)acrylate ester monomer, and 0 to 50 wt % copolymerizable additional vinyl monomer; or 20 to 70 wt % aromatic vinyl monomer, 20 to 70 wt % (meth)acrylate ester monomer, 10 to 60 wt % vinyl cyanide monomer, and 0 to 30 wt % copolymerizable additional vinyl monomer.

The graft copolymer (B) used in the invention is obtained by graft polymerizing 20 to 90 parts by weight of one, or two or more kinds of the above monomers onto 10 to 80 parts by weight of the rubbery polymer (e) (the total of the rubbery polymer and the monomer(s) is 100 parts by weight). If the amount of the rubbery polymer (e) is less than 10 parts by weight, the obtainable thermoplastic resin composition will be poor in impact resistance. The fluidity of the obtainable thermoplastic resin composition is deteriorated if the amount of the rubbery polymer (e) is larger than 80 parts by weight. It is preferable that the amount of the rubbery polymer (e) be 30 to 70 parts by weight and that of the monomer(s) be 30 to 70 parts by weight, and it is more preferable that the amount of the rubbery polymer (e) be 40 to 60 parts by weight and that of the monomer(s) be 60 to 40 parts by weight (the total of the rubbery polymer and the monomer(s) is 100 parts by weight).

The graft copolymer (B) in the invention may be produced by any techniques without limitation, for example, by emulsion polymerization, suspension polymerization or bulk polymerization. In the case of emulsion polymerization, graft polymerization of the above monomers to the rubbery polymer (e) results in a latex of the graft copolymer (B). The latex of the graft copolymer (B) may be solidified by a known method, and the solid may be washed, dehydrated and dried to give a powder of the graft copolymer (B).

When the graft copolymer (B) is produced by emulsion polymerization, the molecular weight and graft ratio of the grafted components may be controlled by appropriately selecting the type and amount of the emulsifier, the type and amount of the initiator, and the production conditions such as polymerization time, polymerization temperature and stirring conditions.

The emulsifier used in the emulsion polymerization is preferably an anionic emulsifier because it provides excellent stability of the latex during the emulsion polymerization and allows the polymerization ratio to be increased. Examples of the anionic emulsifiers include carboxylate salts (for example, sodium sarcosinate, fatty acid potassium, fatty acid sodium, dipotassium alkenylsuccinate and rosin acid soap), alkylsulfate ester salts, sodium alkylbenzenesulfonates, sodium alkylsulfosuccinates and sodium polyoxyethylene nonylphenyl ether sulfate esters. To prevent the hydrolysis of the monomers, preferred emulsifiers are, among others, sodium sarcosinate, dipotassium alkenylsuccinates, alkylsulfate ester salts, sodium alkylbenzenesulfonates, sodium alkylsulfosuccinates and sodium polyoxyethylene nonylphenyl ether sulfate esters. From points of view such as polymerization stability, dipotassium alkenylsuccinates are particularly preferable. These emulsifiers may be used solely, or two or more may be used in combination.

The graft copolymer (B) may be recovered from the graft copolymer (B) latex resulting from the emulsion graft polymerization by, for example, a wet process in which the graft copolymer (B) latex is added to a solution of a coagulant in hot water to cause the copolymer to be flocculated as a slurry, or a spray dry process in which the graft copolymer (B) is recovered semi-directly by spraying the graft copolymer (B) latex to an atmosphere being heated.

Examples of the coagulants used in the wet process include inorganic acids such as sulfuric acid, hydrochloric acid, phosphoric acid and nitric acid, and metal salts such as calcium chloride, calcium acetate and aluminum sulfate. The coagulant is selected in accordance with the emulsifier used in the polymerization. While the recovery of the graft copolymer (B) is feasible with any type of a coagulant when the emulsifier used is a carboxylic acid soap alone such as fatty acid soap or rosin acid soap, it is preferable that the graft copolymer (B) be recovered using an inorganic acid from the point of view of residential thermal stability. In the case where the system includes an emulsifier that exhibits a stable emulsifying ability even under acidic conditions such as sodium alkylbenzenesulfonate, it is necessary to use a metal salt as the coagulant because the addition of an inorganic acid causes the recovered liquid to become cloudy and thus makes the recovery of the graft copolymer (B) difficult.

To obtain the graft copolymer (B) in the dry state from the slurry of the graft copolymer (B) resulting from the wet process, a method may be adopted in which the residue of the emulsifier remaining in the slurry is dissolved into water by washing and thereafter the slurry is dehydrated with a device such as a centrifuge or a press dehydrator and dried with a dryer such as an airborne dryer. Alternatively, dehydration and drying may be performed simultaneously with a device such as a compression dehydrator or an extruder. By these methods, the graft copolymer (B) may be obtained as a dry powder or particles. The graft copolymer (B) discharged from a compression dehydrator or an extruder may be supplied, without being recovered, directly to an extruder or a molding apparatus in which the resin composition will be produced and shaped.

In the graft copolymer (B) used in the invention, the graft ratio (determined from the amounts of acetone-soluble and acetone-insoluble components of the graft copolymer (B), and the weight of the rubbery polymer in the graft copolymer (B)), and the reduced viscosity of acetone-soluble components (measured at 25° C. with respect to a 0.2 g/dL N,N-dimethylformamide solution) are not particularly limited, and the structure may be selected appropriately in accordance with the desired performance. From the point of view of the balance of properties, the graft ratio is preferably 5 to 150% and the reduced viscosity is preferably 0.2 to 2.0 dL/g.

Specifically, the graft ratio in the graft copolymer (B) and the reduced viscosity of acetone-soluble components are measured by the methods described later in the section of Examples.

<Copolymer (C)>

The copolymer (C) used in the invention is obtained by copolymerizing two or more monomers selected from an aromatic vinyl monomer, a vinyl cyanide monomer and another vinyl monomer copolymerizable with these monomers. The monomers for constituting the copolymer (C) may be similar to those monomers used for the graft copolymer (B).

The ratio of the monomers in the copolymer (C) is not particularly limited. For example, the copolymer is obtained by polymerizing a monomer mixture including 60 to 95 wt %, or preferably 70 to 85 wt % of an aromatic vinyl monomer, 5 to 40 wt %, or preferably 15 to 30 wt % of a vinyl cyanide monomer, and 0 to 40 wt %, or preferably 0 to 30 wt % of an additional monomer copolymerizable with the above monomers. The above ratio of the aromatic vinyl monomer, the vinyl cyanide monomer and the additional monomer ensures that the graft copolymer (B) and the copolymer (C) will have good compatibility with each other and the obtainable molded articles will be free from appearance defects.

The copolymer (C) may be produced by any methods without limitation, for example, by emulsion polymerization, suspension polymerization, solution polymerization or bulk polymerization.

The weight average molecular weight (Mw) of the copolymer (C) is preferably in the range of 50000 to 200000, and more preferably in the range of 75000 to 150000. If the weight average molecular weight of the copolymer (C) is below this range, the obtainable molded articles will be poor in impact resistance. The workability during molding is decreased if the weight average molecular weight of the copolymer (C) exceeds the above range. The weight average molecular weight of the copolymer (C) is measured by the method described later in the section of Examples.

<Additional Component>

In addition to the component (A), the component (B) and the component (C), the thermoplastic resin composition of the invention may optionally contain additives, for example, hindered amine light stabilizers; antioxidants such as those based on hindered phenols, sulfur-containing organic compounds and phosphorus-containing organic compounds; thermal stabilizers such as those based on phenols and acrylates; UV absorbers such as those based on benzoates, benzotriazoles, benzophenones and salicylates; lubricants such as those based on organic nickels and higher fatty acid amides; plasticizers such as phosphate esters; flame retardants and flame retardant auxiliaries such as halogen-containing compounds, for example, polybromophenyl ether, tetrabromobisphenol-A, brominated epoxy oligomer and brominated polycarbonate oligomer, phosphorus compounds and antimony trioxide; odor masking agents; pigments such as carbon black and titanium oxide; and dyes. Further, reinforcing agents and fillers may be added, with examples including talc, calcium carbonate, aluminum hydroxide, glass fibers, glass flakes, glass beads, carbon fibers and metal fibers.

<Method for Producing the Thermoplastic Resin Composition>

The thermoplastic resin composition of the invention may be obtained by mixing the components described hereinabove. For example, the components may be mixed together with use of a known kneading machine such as an extruder, a roller, a Banbury mixer or a kneader.

The polycarbonate resin (A), the graft copolymer (B) and the copolymer (C) may be mixed in any order and in any manner without limitation. These three components may be mixed in such a manner that two of the components are mixed and kneaded together beforehand and the remaining one component is mixed and kneaded with the mixture. The other components may be mixed and kneaded at any stage without limitation. The melt kneading is preferably performed using a known extruder at 180 to 300° C.

The thermoplastic resin composition of the invention may be used as a mixture with other thermoplastic resins while still achieving its purpose. Examples of such thermoplastic resins include acrylic resins such as polymethyl methacrylate, polyester resins such as polybutylene terephthalate resin, polyethylene terephthalate resin and polylactate resin, and polyamide resins. One, or two or more kinds of these resins may be used.

[Molded Article]

A molded article of the invention is produced by molding the thermoplastic resin composition of the present invention described hereinabove. The thermoplastic resin composition of the invention may be molded by any methods without limitation. Examples of the molding methods include injection molding, extrusion, compression molding, insert molding, vacuum forming and blow molding.

The thermoplastic resin composition of the invention has excellent fluidity and formability, and the molded articles of the invention obtained by molding the composition have excellent impact resistance and heat resistance.

The molded resin articles of the invention are suitably used in various applications such as vehicle parts, building materials, daily necessities, and parts in home appliances and office equipment.

Of the use applications of the molded resin articles of the present invention, examples of the vehicle parts include center clusters, register bezels, console upper panels, cup holders, door armrests, inside handles, various switch parts, moldings such as audio moldings, door mirror housings, radiator grilles, pillar garnishes, rear combination lamp housings, emblems and roof rails. Examples of the building materials include wall materials, floor materials, window frames, handrails, interiors and gutters. Examples of the daily necessities include tableware, toys and miscellaneous goods. Some of the parts in home appliances and office equipment for which the molded articles are suitably applied are home appliance parts such as vacuum cleaner housings, television housings and air conditioner housings, and electrical equipment housings such as communication equipment housings, laptop housings, mobile terminal housings, mobile communication equipment housings and liquid crystal projector housings.

EXAMPLES

Hereinbelow, the present invention will be described in greater detail by presenting Synthetic Examples, Examples and Comparative Examples. The scope of the invention is not limited to such Examples without departing from the spirit of the invention.

In the following description, the term "parts" indicates "parts by weight".

[Methods for Measuring Properties]

The properties of components used for the production of thermoplastic resin compositions in Examples and Comparative Examples were measured by the following methods.

<Viscosity Average Molecular Weight of Polycarbonate Resin>

The viscosity was measured with respect to a solution of the resin in methylene chloride as a solvent with use of an Ubbelohde viscometer, and the molecular weight was calculated using the Schnell's viscosity equation below.

$$[\eta]=1.23\times10^{-4}Mv^{0.83}$$

(In the equation, $\eta$ is the intrinsic viscosity and My is the viscosity average molecular weight.)

<Solid Content in Rubbery Polymer Latex>

Exactly 1 g of a rubbery polymer latex was weighed, and volatile components were evaporated at 200° C. for 20 minutes. The weight of the residue was measured. The solid content in the latex was determined using the following equation.

$$\text{Solid content [\%]} = \frac{\text{Weight of residue}}{\text{Weight of latex}} \times 100$$

<Polymerization Conversion>

The polymerization conversion was determined using the following equation based on the solid content measured above.

Polymerization conversion [%]=(S÷100×Parts by weight of all materials–Parts by weight of materials except monomers and water)/Total weight of monomers×100

S: Solid content [%]

Parts by weight of all materials: Total parts by weight of materials such as monomers and water fed to reactor <Particle Size>

The weight average particle size and the particle sizes for the respective cumulative weight fractions of components such as rubbery polymers, enlarged rubbers and blended rubbers were determined by a photon correlation method using "Microtrac Model: 9230 UPA" manufactured by NIKKISO CO., LTD.

<Graft Ratio in Graft Copolymer>

A graft copolymer weighing 2.5 g was combined with acetone 80 mL, and the mixture was refluxed in a hot water bath at 65° C. for 3 hours to extract acetone-soluble components. The acetone-insoluble components that remained were separated by centrifugation, and the dry weight thereof was measured to calculate the weight proportion of the acetone-insoluble components in the graft copolymer. Based on the weight proportion of the acetone-insoluble components in the graft copolymer, the graft ratio was calculated using the following equation.

$$\text{Graft ratio [\%]} = \frac{\text{Weight proportion of acetone-insoluble components} - \text{Weight proportion of rubbery polymer}}{\text{Weight proportion of rubbery polymer}} \times 100$$

<Reduced Viscosity of Acetone-Soluble Components in Graft Copolymer>

With use of an Ubbelohde viscometer, the reduced viscosity $\eta_{sp}/C$ (unit: dL/g) was measured at 25° C. with respect to an N,N-dimethylformamide solution of acetone-soluble components of a graft copolymer having a concentration of 0.2 g/dL.

<Weight Average Molecular Weight (Mw) of Copolymer>

As a measurement sample, a solution of a copolymer in tetrahydrofuran was analyzed with a GPC (gel permeation chromatograph) (manufactured by TOSOH CORPORATION), and the molecular weight was calibrated relative to polystyrene standards.

[Polycarbonate Resin (A)]

A commercial polycarbonate (A) was provided ("S-2000F" manufactured by Mitsubishi Engineering-Plastics Corporation). The viscosity average molecular weight (Mv) of this polycarbonate resin was 22,000.

Synthesis of Components

Synthetic Example 1: Production of Rubbery Polymer Latex (e-1)

A reactor equipped with a reagent injection container, a condenser tube, a jacket heater and a stirrer was loaded with, while performing stirring, 200 parts of deionized water (hereinafter, written simply as water), 2.4 parts of sodium alkylbenzenesulfonate, 10 parts of n-butyl acrylate, 0.05 parts of triallyl isocyanurate and 0.02 parts of cumene hydroperoxide. The reactor was purged with nitrogen, and thereafter the materials were heated.

At an inside temperature of 60° C., an aqueous solution was added which included 0.09 parts of sodium formaldehydesulfoxylate, 0.006 parts of ferrous sulfate heptahydrate salt, 0.012 parts of disodium ethylenediaminetetraacetate and 5 parts of water. Polymerization was thus initiated. After the generation of polymerization heat was observed, the jacket temperature was set to 60° C. and the polymerization was continued until the generation of polymerization heat ceased. Next, there were introduced, over a period of 10 hours, 1.8 L/h of a mixture liquid including 99.5 parts of n-butyl acrylate, 0.5 parts of triallyl isocyanurate and 0.2 parts of cumene hydroperoxide, 2.4 L/h of an aqueous solution including 2.5 parts of sodium alkylbenzenesulfonate and 115 parts of water, and 100 mL/h of an aqueous solution including 0.09 parts of sodium formaldehydesulfoxylate, 0.006 parts of ferrous sulfate heptahydrate salt, 0.012 parts of disodium ethylenediaminetetraacetate and 5 parts of water. Polymerization was carried out continuously at a polymerization temperature of 60° C. to give a rubbery polymer latex (e-1) (an alkyl acrylate rubber latex) having a solid content of 43 wt %, a weight average particle size of the rubbery polymer of 260 nm, a particle size for a 10 wt % fraction of 110 nm, and a particle size for a 90 wt % fraction of 550 nm.

Synthetic Example 2: Production of Rubbery Polymer Latex (e-2)

A reactor equipped with a reagent injection container, a condenser tube, a jacket heater and a stirrer was loaded with, while performing stirring, 340 parts of water, 1.7 parts of dipotassium alkenylsuccinate (LATEMUL ASK manufactured by Kao Corporation), 100 parts of n-butyl acrylate, 0.5 parts of triallyl isocyanurate and 0.34 parts of t-butyl hydroperoxide. The reactor was purged with nitrogen, and thereafter the materials were heated.

At an inside temperature of 55° C., an aqueous solution was added which included 0.34 parts of sodium formaldehydesulfoxylate, 0.0005 parts of ferrous sulfate heptahydrate salt, 0.0015 parts of disodium ethylenediaminetetraacetate and 10 parts of water. Polymerization was thus initiated. After the generation of polymerization heat was observed, the jacket temperature was set to 60° C. and the polymerization was continued until the generation of polymerization heat ceased. After 3 hours from the start of polymerization, the system was cooled. In this manner, a rubbery polymer latex (e-2) (an alkyl acrylate rubber latex) was obtained which had a solid content of 23 wt %, a weight average particle size of the rubbery polymer of 105 nm, a particle size for a 10 wt % fraction of 70 nm, and a particle size for a 90 wt % fraction of 150 nm.

Synthetic Example 3: Production of Rubbery Polymer Latexes (e-3) to (e-6)

Rubbery polymer latexes (e-3) to (e-6) having the particle sizes shown in Table 1 were obtained in the same manner as in Synthetic Example 2, except that the triallyl isocyanurate was replaced by allyl methacrylate and the amount was changed as described in Table 1.

TABLE 1

| Rubbery polymer | Amounts of raw materials (parts) ※ | | | Weight average | Particle sizes for cumulative weight fractions | |
|---|---|---|---|---|---|---|
| (e) | BA | TAIC | AMA | particle size | 10 wt % | 90 wt % |
| (e-1) | 100 | 0.5 | — | 260 | 110 | 550 |
| (e-2) | 100 | 0.5 | — | 105 | 70 | 150 |
| (e-3) | 100 | — | 0.3 | 100 | 80 | 140 |
| (e-4) | 100 | — | 3.5 | 100 | 80 | 150 |
| (e-5) | 100 | — | 1.2 | 105 | 70 | 150 |
| (e-6) | 100 | — | 0.6 | 105 | 80 | 150 |

※ BA: n-butyl acrylate TAIC: Triallyl isocyanurate AMA: Allyl methacrylate
(In the rubbery polymer (e-1), the amount was converted relative to BA as 100 parts.)

Synthetic Example 4: Production of Rubbery Polymer Latex (e-7)

A heat resistant container was loaded with 100 parts of 1,3-butadiene, 1.0 part of t-dodecylmercaptan, 0.15 parts of potassium persulfate, 1.5 parts of sodium rosinate, 0.02 parts of potassium hydroxide, 0.3 parts of sodium pyrophosphate and 200 parts of water. The reaction was performed at 60° C. After 15 hours, the reaction was terminated by cooling, giving a rubbery polymer latex (e-7) (a polybutadiene rubber latex) having a solid content of 32 wt %, a gel content of 60 wt %, a weight average particle size of 75 nm, a particle size for a 10 wt % fraction of 45 nm, and a particle size for a 90 wt % fraction of 110 nm.

Synthetic Example 5: Production of Rubbery Polymer Latex (e-8)

The procedures in Synthetic Example 4 were repeated, except that the amount of t-dodecylmercaptan was changed from 1.0 part to 0.5 parts, thereby obtaining a rubbery polymer latex (e-8) (a polybutadiene rubber latex) having a solid content of 33 wt %, a gel content of 88 wt %, a weight average particle size of 75 nm, a particle size for a 10 wt % fraction of 40 nm, and a particle size for a 90 wt % fraction of 105 nm.

Synthetic Example 6: Production of Acid Group-Containing Copolymer Latex (K-1)

Under a flow of nitrogen, a reactor equipped with a reagent injection container, a condenser tube, a jacket heater and a stirrer was loaded with 200 parts of water, 2 parts of potassium oleate, 4 parts of sodium dioctylsulfosuccinate, 0.003 parts of ferrous sulfate heptahydrate salt, 0.009 parts of disodium ethylenediaminetetraacetate and 0.3 parts of sodium formaldehydesulfoxylate. The temperature was raised to 60° C. After the temperature had reached 60° C., a mixture including 82 parts of n-butyl acrylate, 18 parts of methacrylic acid and 0.5 parts of cumene hydroperoxide was dropped continuously over a period of 120 minutes. After the completion of the dropwise addition, the mixture was aged at 60° C. for 2 hours. In this manner, an acid group-containing copolymer latex (K-1) was obtained which had a solid content of 33 wt %, a polymerization conversion of 96%, and a weight average particle size of the acid group-containing copolymer of 150 nm.

Synthetic Example 7: Production of Acid Group-Containing Copolymer Latex (K-2)

The procedures in Synthetic Example 6 were repeated, except that 82 parts of n-butyl acrylate and 18 parts of methacrylic acid were changed to 86 parts of n-butyl acrylate and 14 parts of methacrylic acid, thereby obtaining an acid group-containing copolymer latex (K-2) which had a solid content of 33 wt %, a polymerization conversion of 95%, and a weight average particle size of the acid group-containing copolymer of 110 nm.

Synthetic Example 8: Production of Acid Group-Containing Copolymer Latex (K-3)

The procedures in Synthetic Example 6 were repeated, except that 82 parts of n-butyl acrylate and 18 parts of methacrylic acid were changed to 89 parts of n-butyl acrylate and 11 parts of methacrylic acid, thereby obtaining an acid group-containing copolymer latex (K-3) which had a solid content of 33 wt %, a polymerization conversion of 97%, and a weight average particle size of the acid group-containing copolymer of 60 nm.

Synthetic Example 9: Production of Enlarged Rubber Latex (f-1)

A reactor equipped with a reagent injection container, a jacket heater and a stirrer was loaded with 435 parts (100 parts in terms of solids) of the rubbery polymer latex (e-2) and, while performing stirring, the inside temperature was raised to 30° C. with the jacket heater. 0.8 Parts of sodium pyrophosphate was added as a 5 wt % aqueous solution to the reactor, and stirring was performed sufficiently. Thereafter, 3 parts (1 part in terms of solids) of the acid group-containing copolymer latex (K-1) and 0.9 parts (0.3 parts in terms of solids) of the acid group-containing copolymer latex (K-2) were added. The mixture was stirred for 30 minutes while maintaining the inside temperature at 30° C. In this manner, an enlarged rubber latex (f-1) was obtained which had a weight average particle size of the enlarged rubber of 350 nm, a particle size for a 10 wt % fraction of 150 nm, and a particle size for a 90 wt % fraction of 580 nm.

Synthetic Example 10: Production of Enlarged Rubber Latexes (f-2) to (f-14)

Enlarged rubber latexes (f-2) to (f-14) having the particle sizes shown in Table 2 were obtained in the same manner as in Synthetic Example 9, except that the types and amounts of the rubbery polymer latex (e), sodium pyrophosphate and the acid group-containing copolymer latexes (K) were changed as described in Table 2.

Synthetic Example 11: Production of Blend Rubber Latex (g-1)

A reactor equipped with a stirrer was loaded with 260 parts (60 parts in terms of solids) of the rubbery polymer latex (e-3) and 174 parts (40 parts in terms of solids) of the enlarged rubber latex (f-10) while performing stirring. Thus, a blend rubber latex (g-1) was obtained which had a weight average particle size of 130 nm, a particle size for a 10 wt % fraction of 90 nm, and a particle size for a 90 wt % fraction of 490 nm.

Synthetic Example 12: Production of Blend Rubber Latexes (g-2) to (g-5)

Blend rubber latexes (g-2) to (g-5) having the particle sizes shown in Table 3 were obtained in the same manner as in Synthetic Example 11, except that the type and amount of the rubbery polymer latex or the enlarged rubber latex were changed as described in Table 3.

TABLE 3

| Blend rubber latex (g) | Rubbery polymer latex (e) Enlarged rubber latex (f) | | Particle sizes (nm) | | |
|---|---|---|---|---|---|
| | | | Weight average | Particle sizes for cumulative weight fractions | |
| | Type | Solids (parts) | particle size | 10 wt % | 90 wt % |
| (g-1) | (e-3) | 60 | 130 | 90 | 490 |
| | (f-10) | 40 | | | |
| (g-2) | (e-3) | 30 | 450 | 90 | 710 |
| | (f-11) | 70 | | | |
| (g-3) | (e-3) | 70 | 110 | 75 | 640 |
| | (f-11) | 30 | | | |

TABLE 2

| Enlarged rubber latex (f) | Enlarging conditions | | | | | Particle sizes (nm) | | |
|---|---|---|---|---|---|---|---|---|
| | Rubbery polymer latex (e) | | Sodium pyrophosphate | Acid group-containing copolymer latexes (K) | | Weight average particle size | Particle sizes for cumulative weight fractions | |
| | Type | Solids (parts) | Amount (parts) | Type | Solids (parts) | | 10 wt % | 90 wt % |
| (f-1) | (e-2) | 100 | 0.8 | (K-1) | 1 | 350 | 150 | 580 |
| | | | | (K-2) | 0.3 | | | |
| (f-2) | (e-5) | 100 | 0.5 | (K-1) | 0.8 | 280 | 120 | 480 |
| | | | | (K-2) | 0.3 | | | |
| (f-3) | (e-6) | 100 | 0.5 | (K-1) | 0.4 | 210 | 80 | 500 |
| | | | | (K-2) | 0.9 | | | |
| (f-4) | (e-4) | 100 | 2 | (K-1) | 0.6 | 410 | 190 | 570 |
| | | | | (K-2) | 0.5 | | | |
| (f-5) | (e-4) | 100 | 1.5 | (K-1) | 0.8 | 390 | 190 | 620 |
| | | | | (K-2) | 0.5 | | | |
| (f-6) | (e-5) | 100 | 0.8 | (K-1) | 0.8 | 380 | 230 | 550 |
| | | | | (K-2) | 0.2 | | | |
| (f-7) | (e-6) | 100 | 0.6 | (K-1) | 0.5 | 190 | 100 | 510 |
| | | | | (K-2) | 0.8 | | | |
| (f-8) | (e-4) | 100 | 1.3 | (K-3) | 0.1 | 150 | 120 | 190 |
| (f-9) | (e-5) | 100 | 1.5 | (K-2) | 1 | 280 | 150 | 400 |
| (f-10) | (e-6) | 100 | 1.2 | (K-1) | 1.2 | 450 | 260 | 580 |
| (f-11) | (e-6) | 100 | 1.5 | (K-1) | 1.5 | 580 | 250 | 800 |
| | | | | (K-2) | 0.5 | | | |
| (f-12) | (e-7) | 100 | — | (K-3) | 0.5 | 150 | 110 | 190 |
| (f-13) | (e-7) | 100 | — | (K-2) | 0.4 | 320 | 280 | 360 |
| (f-14) | (e-8) | 100 | — | (K-2) | 0.7 | 450 | 300 | 690 |

TABLE 3-continued

| Blend rubber latex (g) | Rubbery polymer | | Particle sizes (nm) | | |
|---|---|---|---|---|---|
| | latex (e) Enlarged rubber latex (f) | | | Particle sizes for cumulative weight fractions | |
| | Type | Solids (parts) | Weight average particle size | 10 wt % | 90 wt % |
| (g-4) | (f-12) | 30 | 390 | 150 | 670 |
| | (f-14) | 70 | | | |
| (g-5) | (f-13) | 50 | 350 | 280 | 600 |
| | (f-14) | 50 | | | |

Synthetic Example 13: Production of Graft Copolymer (B-1)

A reactor equipped with a reagent injection container, a condenser tube, a jacket heater and a stirrer was loaded with 260 parts of water (including the water in the rubber latex), 140 parts (60 parts in terms of solids) of the rubbery polymer latex (e-1) and 0.5 parts of sodium alkylbenzenesulfonate. The temperature of the liquid in the reactor was raised to 60° C. Thereafter, there were added dropwise, over a period of 2 hours, an aqueous solution including 0.2 parts of sodium formaldehydesulfoxylate, 0.003 parts of ferrous sulfate heptahydrate salt, 0.017 parts of disodium ethylenediaminetetraacetate and 10 parts of water, and a mixture liquid including 15 parts of acrylonitrile, 25 parts of styrene and 0.2 parts of cumene hydroperoxide, thereby performing polymerization. After the completion of the dropwise addition, the liquid was stirred for 30 minutes while keeping the inside temperature at 60° C., and was thereafter cooled. A graft copolymer (B-1) latex was thus obtained.

Next, 150 parts of a 1 wt % aqueous calcium acetate (Ca acetate) solution was heated to 75° C. While stirring the aqueous solution, 100 parts of the graft copolymer (B-1) latex was dropped gradually to the aqueous solution, and the graft copolymer (B-1) was solidified. Further, the temperature was increased to 90° C. and was held constant for 5 minutes. Next, the solids were dehydrated, washed and dried to give the graft copolymer (B-1) as a powder.

Synthetic Example 14: Production of Graft Copolymer (B-2)

A reactor equipped with a reagent injection container, a condenser tube, a jacket heater and a stirrer was loaded with 220 parts of water (including the water in the rubber latex), 250 parts (60 parts in terms of solids) of the enlarged rubber latex (f-1) and 0.2 parts of dipotassium alkenylsuccinate (LATEMUL ASK manufactured by Kao Corporation). The temperature of the liquid in the reactor was raised to 70° C. Thereafter, there was added an aqueous solution including 0.3 parts of sodium formaldehydesulfoxylate, 0.001 part of ferrous sulfate heptahydrate salt, 0.03 parts of disodium ethylenediaminetetraacetate and 10 parts of water. Next, a mixture liquid including 15 parts of acrylonitrile, 25 parts of styrene and 0.2 parts of t-butyl hydroperoxide was added dropwise over a period of 2 hours, thereby performing polymerization. After the completion of the dropwise addition, the liquid was stirred for 30 minutes while keeping the inside temperature at 60° C., and was thereafter cooled. A graft copolymer (B-2) latex was thus obtained.

Next, 150 parts of a 1.2 wt % aqueous sulfuric acid solution was heated to 75° C. While stirring the aqueous solution, 100 parts of the graft copolymer (B-2) latex was dropped gradually to the aqueous solution, and the graft copolymer (B-2) was solidified. Further, the temperature was increased to 90° C. and was held constant for 5 minutes. Next, the solids were dehydrated, washed and dried to give the graft copolymer (B-2) as a powder.

Synthetic Example 15: Production of Graft Copolymers (B-3) to (B-16)

Powdery graft copolymers (B-3) to (B-16) were obtained in the same manner as in Synthetic Example 14, except that the types and amounts of the rubbery polymer latex, the enlarged rubber latex or the blend rubber latex, the monomer components and the coagulant were changed as described in Table 4.

Synthetic Example 16: Production of Graft Copolymer (B-17)

An autoclave was loaded with 240 parts of water (including the water in the rubber latex), 180 parts (60 parts in terms of solids) of the blend rubber latex (g-4), 1.5 parts of semi-hydrogenated tallow soda soap, and an aqueous solution including 0.05 parts of potassium hydroxide, 0.004 parts of ferrous sulfate heptahydrate salt, 0.1 part of sodium pyrophosphate, 0.15 parts of crystalline glucose and 10 parts of water. The temperature of the liquid in the reactor was increased to 60° C. While keeping the temperature at 60° C., a mixture liquid including 13 parts of acrylonitrile, 27 parts of styrene and 0.2 parts of cumene hydroperoxide was added dropwise over a period of 2 hours, thereby performing polymerization. After the completion of the dropwise addition, the liquid was stirred for 30 minutes while keeping the inside temperature at 65° C., and was thereafter cooled. A graft copolymer (B-17) latex was thus obtained.

Next, an antioxidant was added to the graft copolymer latex (B-17), and 150 parts of a 1.2 wt % aqueous sulfuric acid solution was heated to 75° C. While stirring the aqueous solution, 100 parts of the graft copolymer (B-17) latex was dropped gradually to the aqueous solution, and the graft copolymer (B-17) was solidified. Further, the temperature was increased to 90° C. and was held constant for 5 minutes. Next, the solids were dehydrated, washed and dried to give the graft copolymer (B-17) as a powder.

Synthetic Example 17: Production of Graft Copolymer (B-18)

A graft copolymer (B-18) was obtained as a powder in the same manner as in Synthetic Example 16, except that the blend rubber latex (g-4) was replaced by the blend rubber latex (g-5).

Table 4 describes the graft ratios and the reduced viscosities of acetone-soluble components of the graft copolymers obtained.

TABLE 4

| Graft copolymer (B) | Rubbery polymer, polymer, enlarged rubber or blend rubber latex | | | | | | | Graft ratio (%) | Reduced viscosity of acetone-soluble components (dL/g) |
|---|---|---|---|---|---|---|---|---|---|
| | Type | Weight average particle size (nm) | Particle sizes for cumulative weight fractions (nm) | | Solids (parts) | Monomer components (parts) | | | |
| | | | 10 wt % | 90 wt % | | Acrylonitrile | Styrene | Coagulant | |
| (B-1) | (e-1) | 260 | 110 | 550 | 60 | 15 | 25 | Ca acetate | 47 | 0.47 |
| (B-2) | (f-1) | 350 | 150 | 580 | 60 | 15 | 25 | Sulfuric acid | 51 | 0.45 |
| (B-3) | (f-2) | 280 | 120 | 480 | 50 | 15 | 35 | Ca acetate | 65 | 0.49 |
| (B-4) | (f-3) | 210 | 80 | 500 | 50 | 15 | 35 | Ca acetate | 60 | 0.58 |
| (B-5) | (f-4) | 410 | 190 | 570 | 50 | 15 | 35 | Ca acetate | 80 | 0.47 |
| (B-6) | (f-5) | 390 | 190 | 620 | 50 | 15 | 35 | Sulfuric acid | 81 | 0.46 |
| (B-7) | (f-6) | 380 | 230 | 550 | 50 | 15 | 35 | Sulfuric acid | 58 | 0.55 |
| (B-8) | (f-7) | 190 | 100 | 510 | 50 | 15 | 35 | Sulfuric acid | 61 | 0.52 |
| (B-9) | (e-3) | 100 | 80 | 140 | 50 | 15 | 35 | Sulfuric acid | 33 | 0.65 |
| (B-10) | (f-8) | 150 | 120 | 190 | 50 | 15 | 35 | Sulfuric acid | 83 | 0.46 |
| (B-11) | (f-9) | 280 | 150 | 400 | 50 | 15 | 35 | Sulfuric acid | 64 | 0.64 |
| (B-12) | (f-10) | 450 | 260 | 580 | 50 | 15 | 35 | Sulfuric acid | 44 | 0.74 |
| (B-13) | (f-11) | 580 | 250 | 800 | 50 | 15 | 35 | Sulfuric acid | 42 | 0.76 |
| (B-14) | (g-1) | 130 | 90 | 490 | 50 | 15 | 35 | Sulfuric acid | 37 | 0.69 |
| (B-15) | (g-2) | 450 | 90 | 710 | 50 | 15 | 35 | Sulfuric acid | 41 | 0.71 |
| (B-16) | (g-3) | 110 | 75 | 640 | 50 | 15 | 35 | Sulfuric acid | 35 | 0.68 |
| (B-17) | (g-4) | 390 | 150 | 670 | 60 | 13 | 27 | Sulfuric acid | 51 | 0.58 |
| (B-18) | (g-5) | 350 | 280 | 600 | 60 | 13 | 27 | Sulfuric acid | 43 | 0.62 |

Synthetic Example 18: Production of Copolymer (C)

A nitrogen-purged reactor was loaded with 120 parts of water, 0.002 parts of sodium alkylbenzenesulfonate, 0.5 parts of polyvinyl alcohol, 0.3 parts of azoisobutyronitrile and 0.5 parts of t-dodecylmercaptan. A monomer mixture including 27 parts of acrylonitrile and 73 parts of styrene was used. While adding styrene in portions sequentially, the temperature was increased from a start temperature of 60° C. to 120° C. in 5 hours. The reaction was further performed at 120° C. for 4 hours, and thereafter the product was recovered. In this manner, a copolymer (C) having a weight average molecular weight (Mw) of 110000 was obtained.

Production and Evaluation of Thermoplastic Resin Composition

Examples 1 to 19 and Comparative Examples 1 to 16

The polycarbonate resin (A), the graft copolymer (B) and the copolymer (C) were used in the combinations described in Tables 5 to 7 and in the amounts shown in Tables 5 to 7. Further, 0.5 parts of lubricant "FLO-THENE UF" manufactured by SUMITOMO SEIKA CHEMICALS CO., LTD. was used as an additive (D). These materials were mixed together with use of a Henschel mixer. The resultant mixture was melt-kneaded using twin-screw extruder TEX28V manufactured by The Japan Steel Works, LTD., at 260° C. to give pellets. The pellets were subjected to the following evaluations of properties. The evaluation results are described in Tables 5 to 7.

<Impact Resistance>

The pellets obtained in Examples and Comparative Examples were each formed into test pieces in accordance with ISO Test Method 294, and impact resistance was measured at prescribed temperatures (23° C. and −30° C.). In the impact resistance test, the thickness was 4 mm, and the notched Charpy impact strength was measured in accordance with ISO 179. The unit is kJ/m$^2$. (NB indicates Non Break, meaning that the test piece was not broken and the strength was unmeasurable.)

<Fluidity>

The pellets obtained in Examples and Comparative Examples were each tested in accordance with ISO 1133 to determine the melt volume flow rate at 220° C. and 10 kg load. The unit is cm$^3$/10 min.

<Flexural Elastic Modulus>

The pellets obtained in Examples and Comparative Examples were each formed into test pieces in accordance with ISO Test Method 294. The flexural elastic modulus was measured at a temperature of 23° C. in accordance with ISO 178. The unit is GPa.

<Heat Resistance>

The pellets obtained in Examples and Comparative Examples were each formed into test pieces in accordance with ISO Test Method 294. The deflection temperature under load was measured under a load of 1.8 MPa in accordance with ISO 75. The unit is ° C.

<Residential Thermal Stability>

The pellets obtained in Examples and Comparative Examples were molded on an injection molding machine (IS55FP-1.5A manufactured by TOSHIBA ELECTRIC APPLIANCES CO., LTD., cylinder temperature: 280° C., mold temperature: 60° C.) while adopting a molding cycle of 50 seconds or a molding cycle of 10 minutes. The molded articles obtained were tested by the above impact resistance test (23° C.)

TABLE 5

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Thermoplastic resin composition (parts) | | Polycarbonate resin (A) | 60 | 60 | 60 | 60 | 60 | 60 | 60 | 60 | 60 | 60 |
| | Graft copolymer (B) | (B-1) | 10 | 15 | 20 | 30 | | | | | | |
| | | (B-2) | | | | | 20 | | | | | |
| | | (B-3) | | | | | | 20 | | | | |
| | | (B-4) | | | | | | | 20 | | | |
| | | (B-5) | | | | | | | | 20 | | |
| | | (B-6) | | | | | | | | | 20 | |
| | | (B-7) | | | | | | | | | | 20 |
| | | (B-8) | | | | | | | | | | |
| | | (B-9) | | | | | | | | | | |
| | | (B-10) | | | | | | | | | | |
| | | (B-11) | | | | | | | | | | |
| | | (B-12) | | | | | | | | | | |
| | | (B-13) | | | | | | | | | | |
| | | (B-14) | | | | | | | | | | |
| | | (B-15) | | | | | | | | | | |
| | | (B-16) | | | | | | | | | | |
| | | (B-17) | | | | | | | | | | |
| | | (B-18) | | | | | | | | | | |
| | | Copolymer (C) | 30 | 25 | 20 | 10 | 20 | 20 | 20 | 20 | 20 | 20 |
| | | Additive (D) | 0.5 | 0.5 | 0.5 | 0.5 | 0.5 | 0.5 | 0.5 | 0.5 | 0.5 | 0.5 |
| Evaluation results | Properties | Impact resistance(23° C.)(kJ/m$^2$) | NB | NB | NB | NB | NB | 119 | 110 | 96 | 92 | 99 |
| | | Impact resistance(−30° C.)(kJ/m$^2$) | 12 | 21 | 29 | 31 | 27 | 25 | 24 | 21 | 20 | 21 |
| | | Fluidity (cm$^3$/10 min) | 6 | 6 | 5 | 4 | 5 | 5 | 4 | 5 | 6 | 5 |
| | | Flexural elastic modulus(GPa) | 2.6 | 2.4 | 2.2 | 2.0 | 2.1 | 2.3 | 2.2 | 2.2 | 2.1 | 2.2 |
| | | Deflection temperature under load(° C.) | 102 | 102 | 102 | 102 | 102 | 102 | 101 | 102 | 102 | 102 |
| | Residential thermal stability | Impact resistance (23° C.)(kJ/m$^2$) (Cycle time: 50 seconds) | 39 | 65 | 59 | 60 | 86 | 55 | 54 | 45 | 73 | 78 |
| | | (Cycle time: 10 minutes) | 12 | 17 | 35 | 33 | 85 | 35 | 30 | 27 | 71 | 77 |

TABLE 6

| | | | Examples | | | | | | | | |
|---|---|---|---|---|---|---|---|---|---|---|---|
| | | | 11 | 12 | 13 | 14 | 15 | 16 | 17 | 18 | 19 |
| Thermoplastic resin composition (parts) | | Polycarbonate resin (A) | 60 | 70 | 45 | 30 | 95 | 90 | 80 | 70 | 50 |
| | Graft copolymer (B) | (B-1) | | 5 | 40 | 60 | 5 | 10 | 20 | 30 | 50 |
| | | (B-2) | | | | | | | | | |
| | | (B-3) | | | | | | | | | |
| | | (B-4) | | | | | | | | | |
| | | (B-5) | | | | | | | | | |
| | | (B-6) | | | | | | | | | |
| | | (B-7) | | | | | | | | | |
| | | (B-8) | 20 | | | | | | | | |
| | | (B-9) | | | | | | | | | |
| | | (B-10) | | | | | | | | | |
| | | (B-11) | | | | | | | | | |
| | | (B-12) | | | | | | | | | |
| | | (B-13) | | | | | | | | | |
| | | (B-14) | | | | | | | | | |
| | | (B-15) | | | | | | | | | |
| | | (B-16) | | | | | | | | | |
| | | (B-17) | | | | | | | | | |
| | | (B-18) | | | | | | | | | |
| | | Copolymer (C) | 20 | 25 | 15 | 10 | | | | | |
| | | Additive (D) | 0.5 | 0.5 | 0.5 | 0.5 | 0.5 | 0.5 | 0.5 | 0.5 | 0.5 |
| Evaluation results | Properties | Impact resistance(23° C.)(kJ/m$^2$) | 104 | 54 | 94 | 83 | 61 | 59 | 61 | 69 | 78 |
| | | Impact resistance(−30° C.)(kJ/m$^2$) | 24 | 7 | 28 | 25 | 43 | 48 | 47 | 61 | 58 |
| | | Fluidity (cm$^3$/10 min) | 5 | 8 | 4 | 3 | 1 | 1 | 2 | 2 | 2 |
| | | Flexural elastic modulus(GPa) | 2.2 | 2.7 | 1.9 | 1.6 | 2.2 | 2.1 | 1.9 | 1.7 | 1.4 |
| | | Deflection temperature under load(° C.) | 101 | 111 | 97 | 94 | 121 | 117 | 111 | 106 | 91 |
| | Residential thermal stability | Impact resistance (23° C.)(kJ/m$^2$) (Cycle time: 50 seconds) | 81 | 21 | 41 | 32 | 31 | 27 | 26 | 30 | 24 |
| | | (Cycle time: 10 minutes) | 79 | 6 | 28 | 22 | 11 | 17 | 14 | 15 | 19 |

TABLE 7

| Thermoplastic resin composition (parts) | | | Comparative Examples | | | | | | | | | | | | | | | |
|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 |
| Polycarbonate resin (A) | | | 70 | 6 | 60 | 60 | 60 | 60 | 60 | 60 | 60 | 60 | 60 | 60 | 80 | 80 | 80 | 80 |
| Graft copolymer (B) | (B-1) | | 3 | 92 | | | | | | | | | | | | | | |
| | (B-2) | | | | 20 | | | | | | | | | | | | | |
| | (B-3) | | | | | 20 | | | | | | | | | | | | |
| | (B-4) | | | | | | 20 | | | | | | | | | | | |
| | (B-5) | | | | | | | 20 | | | | | | | | | | |
| | (B-6) | | | | | | | | 20 | | | | | | | | | |
| | (B-7) | | | | | | | | | 20 | | | | | | | | |
| | (B-8) | | | | | | | | | | 20 | | | | | | | |
| | (B-9) | | | | | | | | | | | 20 | | | 20 | | | |
| | (B-10) | | | | | | | | | | | | 20 | | | 20 | | |
| | (B-11) | | | | | | | | | | | | | 20 | | | | |
| | (B-12) | | | | | | | | | | | | | 20 | | | | |
| | (B-13) | | | | | | | | | | | | | | | | 20 | |
| | (B-14) | | | | | | | | | | | | | | | | | 20 |
| | (B-15) | | | | | | | | | | | | | | | | | |
| | (B-16) | | | | | | | | | | | | | | | | | |
| | (B-17) | | | | | | | | | | | | | | | | | |
| | (B-18) | | | | | | | | | | | | | | | | | |
| Copolymer (C) | | | 27 | 2 | 20 | 20 | 20 | 20 | 20 | 20 | 20 | 20 | 20 | 20 | | | | |
| Additive (D) | | | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Evaluation results | Properties | Impact resistance (23° C.)(kJ/m²) | 28 | 28 | 67 | 52 | 48 | 48 | 42 | 67 | 45 | 59 | 51 | 50 | 47 | 32 | 38 | 43 |
| | | Impact resistance (−30° C.)(kJ/m²) | 5 | 18 | 24 | 12 | 11 | 11 | 9 | 22 | 12 | 18 | 41 | 44 | 44 | 29 | 31 | 41 |
| | | Fluidity (cm³/10 min) | 8 | 0.3 | 6 | 4 | 5 | 5 | 5 | 5 | 5 | 6 | 4 | 4 | 2 | 2 | 2 | 2 |
| | | Flexural elastic modulus (GPa) | 2.7 | 0.7 | 2.1 | 2.2 | 2.1 | 2.1 | 2.1 | 2.3 | 2.1 | 2.1 | 2.1 | 2.2 | 1.8 | 1.9 | 1.9 | 1.9 |
| | | Deflection temperature under load (° C.) | 112 | 71 | 102 | 101 | 101 | 101 | 101 | 102 | 101 | 102 | 103 | 102 | 110 | 113 | 111 | 111 |
| | Residential thermal stability | Impact resistance (23° C.) (kJ/m²) (Cycle time: 50 seconds) | 20 | 24 | 55 | 40 | 44 | 44 | 35 | 53 | 40 | 49 | 43 | 40 | 23 | 21 | 19 | 20 |
| | | (Cycle time: 10 minutes) | 12 | 22 | 54 | 40 | 44 | 43 | 33 | 52 | 39 | 47 | 36 | 33 | 15 | 11 | 12 | 14 |

As shown in Tables 5 and 6, the inventive thermoplastic resin compositions of Examples 1 to 19 attained an excellent balance of properties such as impact resistance, fluidity and heat resistance. In particular, excellent heat resistance was obtained in Example 12. Good impact resistance was obtained in Examples 6 to 11, 13 and 14. Examples 1 to 4 attained a higher enhancement in impact resistance. In Example 5, in which the graft copolymer was recovered using sulfuric acid, good residential thermal stability was also obtained.

As shown in Table 7, poor impact resistance was caused in Comparative Example 1 which involved less than 5 parts by weight of the graft copolymer (B) and in Comparative Example 2 in which the amount of the graft copolymer (B) was larger than 90 parts by weight. Impact resistance was poor in Comparative Examples 3, 7, 8, 10 and 13 in which the rubbery polymer in the graft copolymer (B) had a weight average particle size outside the range of 150 to 450 nm. Poor impact resistance was also encountered in Comparative Examples 6, 12 and 16 in which the particle size of the rubbery polymer for a cumulative weight fraction of 10 wt % was outside the range of 50 to 250 nm, and in Comparative Examples 3 to 5, 7, 9, 11 and 13 to 15 in which the particle size for a 90 wt % fraction was outside the range of 450 to 650 nm.

INDUSTRIAL APPLICABILITY

The thermoplastic resin compositions and molded articles thereof provided according to the invention have an excellent balance of properties such as impact resistance, fluidity and heat resistance. The thermoplastic resin compositions and molded articles thereof according to the invention are useful in applications such as vehicle parts, building materials, daily necessities, and parts in home appliances and office equipment.

Although the present invention has been described in detail with respect to some specific embodiments, the skilled person will appreciate that various modifications are possible within the spirit and scope of the invention.

This application is based upon Japanese Patent Application No. 2014-122591 filed on Jun. 13, 2014, the entire contents of which are incorporated herein by reference.

The invention claimed is:

1. A thermoplastic resin composition, comprising:
   30 to 60 parts by weight of a polycarbonate resin (A),
   20 to 60 parts by weight of a graft copolymer (B), and
   10 to 20 parts by weight of a copolymer (C) wherein the total is 100 parts by weight,
   the graft copolymer (B) being a graft copolymer obtained by graft polymerizing 20 to 90 parts by weight of at least one monomer including at least an aromatic vinyl monomer and/or a vinyl cyanide monomer to 10 to 80 parts by weight of alkyl(meth)acrylate rubber having a weight average particle size of 150 to 450 nm and having a particle size for a cumulative weight fraction of 10 wt % of 50 to 150 nm and a particle size for a cumulative weight fraction of 90 wt % of 450 to 650 nm (wherein a total of the alkyl(meth)acrylate rubber and the monomer(s) is 100 parts by weight); and
   the copolymer (C) being a copolymer obtained by polymerizing a monomer mixture including 60 to 95 wt % of an aromatic vinyl monomer, 5 to 40 wt % of a vinyl cyanide monomer, and 0 to 40 wt % of an additional monomer copolymerizable with said monomers, and a weight average molecular weight (Mw) of the copolymer (C) being in a range of 50000 to 200000.

2. The thermoplastic resin composition according to claim 1, wherein the alkyl(meth)acrylate rubber in the graft copolymer (B) is obtained by adding a condensed acid salt to a latex of a rubbery polymer with a small particle size and thereafter mixing the latex with an acid group-containing copolymer latex to enlarge the particle size.

3. The thermoplastic resin composition according to claim 2, wherein an amount of the condensed acid salt added is 0.1 to 10 parts by weight with respect to 100 parts by mass (in terms of solids) of the latex of the rubbery polymer with the small particle size, and an amount of the acid group-containing copolymer latex is 0.1 to 10 parts by mass (in terms of solids) with respect to 100 parts by mass (in terms of solids) of the latex of the rubbery polymer with the small particle size.

4. The thermoplastic resin composition according to claim 2, wherein the acid group-containing copolymer latex is obtained by polymerizing a monomer mixture including an acid group-containing monomer, an alkyl (meth)acrylate ester monomer and optionally an additional monomer copolymerizable with these monomers.

5. The thermoplastic resin composition according to claim 1, wherein a composition of the monomers to be graft polymerized to the alkyl(meth)acrylate rubber to form the graft copolymer (B) is one selected from the group consisting of:
   60 to 90 wt % aromatic vinyl monomer, 10 to 40 wt % vinyl cyanide monomer, and 0 to 30 wt % copolymerizable additional vinyl monomer;
   30 to 80 wt % aromatic vinyl monomer, 20 to 70 wt % (meth)acrylate ester monomer, and 0 to 50 wt % copolymerizable additional vinyl monomer; and
   20 to 70 wt % aromatic vinyl monomer, 20 to 70 wt % (meth)acrylate ester monomer, 10 to 60 wt % vinyl cyanide monomer, and 0 to 30 wt % copolymerizable additional vinyl monomer.

6. The thermoplastic resin composition according to claim 1, wherein the graft copolymer (B) has a graft ratio of 5 to 150% and the reduced viscosity of 0.2 to 2.0 dL/g.

7. A molded article obtained by molding the thermoplastic resin composition according to claim 1.

8. The thermoplastic resin composition according to claim 3, wherein the acid group-containing copolymer latex is obtained by polymerizing a monomer mixture including an acid group-containing monomer, an alkyl (meth)acrylate ester monomer and optionally an additional monomer copolymerizable with these monomers.

9. The thermoplastic resin composition according to claim 2, wherein a composition of the monomers to be graft polymerized to the alkyl(meth)acrylate rubber to form the graft copolymer (B) is one selected from the group consisting of:
   60 to 90 wt % aromatic vinyl monomer, 10 to 40 wt % vinyl cyanide monomer, and 0 to 30 wt % copolymerizable additional vinyl monomer;
   30 to 80 wt % aromatic vinyl monomer, 20 to 70 wt % (meth)acrylate ester monomer, and 0 to 50 wt % copolymerizable additional vinyl monomer; and
   20 to 70 wt % aromatic vinyl monomer, 20 to 70 wt % (meth)acrylate ester monomer, 10 to 60 wt % vinyl cyanide monomer, and (1 to 30 wt % copolymerizable additional vinyl monomer.

10. The thermoplastic resin composition according to claim 3, wherein a composition of the monomers to be graft polymerized to the alkyl(meth)acrylate rubber to form the graft copolymer (B) is one selected from the group consisting of:

60 to 90 wt % aromatic vinyl monomer, 10 to 40 wt % vinyl cyanide monomer, and 0 to 30 wt % copolymerizable additional vinyl monomer;

30 to 80 wt % aromatic vinyl monomer, 20 to 70 wt % (meth)acrylate ester monomer, and 0 to 50 wt % copolymerizable additional vinyl monomer; and 20 to 70 wt % aromatic vinyl monomer, 20 to 70 wt % (meth)acrylate ester monomer, 10 to 60 wt % vinyl cyanide monomer, and 0 to 30 wt % copolymerizable additional vinyl monomer.

11. The thermoplastic resin composition according to claim 4, wherein a composition of the monomers to be graft polymerized to the alkyl(meth)acrylate rubber to form the graft copolymer (B) is one selected from the group consisting of:

60 to 90 wt % aromatic vinyl monomer, 10 to 40 wt % vinyl cyanide monomer, and 0 to 30 wt % copolymerizable additional vinyl monomer;

30 to 80 wt % aromatic vinyl monomer, 20 to 70 wt % (meth)acrylate ester monomer, and 0 to 50 wt % copolymerizable additional vinyl monomer; and 20 to 70 wt % aromatic vinyl monomer, 20 to 70 wt % (meth)acrylate ester monomer, 10 to 60 wt % vinyl cyanide monomer, and 0 to 30 wt % copolymerizable additional vinyl monomer.

12. The thermoplastic resin composition according to claim 2, wherein the graft copolymer (B) has a graft ratio of 5 to 150% and the reduced viscosity of 0.2 to 2.0 dL/g.

13. The thermoplastic resin composition according to claim 3, wherein the graft copolymer (B) has a graft ratio of 5 to 150% and the reduced viscosity of 0.2 to 2.0 dL/g.

14. The thermoplastic resin composition according to claim 4, wherein the graft copolymer (B) has a graft ratio of 5 to 150% and the reduced viscosity of 0.2 to 2.0 dL/g.

15. The thermoplastic resin composition according to claim 5, wherein the graft copolymer (B) has a graft ratio of 5 to 150% and the reduced viscosity of 0.2 to 2.0 dL/g.

16. A molded article obtained by molding the thermoplastic resin composition according to claim 2.

17. A molded article obtained by molding the thermoplastic resin composition according to claim 3.

18. A molded article obtained by molding the thermoplastic resin composition according to claim 4.

19. A molded article obtained by molding the thermoplastic resin composition according to claim 5.

20. The thermoplastic resin composition according to claim 1, wherein the thermoplastic resin comprises 30 parts by weight of the polycarbonate resin (A).

* * * * *